(12) United States Patent
Barusseau et al.

(10) Patent No.: US 6,183,907 B1
(45) Date of Patent: Feb. 6, 2001

(54) BINDER FOR AN ELECTRODE OF AN ELECTROCHEMICAL SYSTEM WITH A NON-AQUEOUS ELECTROLYTE

(75) Inventors: Sylvie Barusseau, Bretigny sur Orge; Florence Martin, La Norville; Bernard Simon, Issy les Moulineaux, all of (FR)

(73) Assignee: Alcatel, Paris (FR)

( * ) Notice: Under 35 U.S.C. 154(b), the term of this patent shall be extended for 0 days.

(21) Appl. No.: 09/127,784

(22) Filed: Aug. 3, 1998

(30) Foreign Application Priority Data

Aug. 4, 1997 (FR) .................................................. 97 09948

(51) Int. Cl.$^7$ ....................................................... H01M 4/62
(52) U.S. Cl. .................. 429/217; 429/218.1; 429/231.1; 429/231.8; 429/336; 429/337; 429/342
(58) Field of Search ................................ 429/217, 218.1, 429/231.1, 231.8, 336, 337, 342

(56) References Cited

U.S. PATENT DOCUMENTS 5,340,672 * 8/1994 Kubota et al. ........................ 429/249
5,595,841 * 1/1997 Suzuki ................................. 429/217

FOREIGN PATENT DOCUMENTS 0 848 435 * 6/1998 (EP) .

OTHER PUBLICATIONS

Patent Abstracts of Japan, vol. 017, No. 199 (E–1352) Apr. 19, 1993 corresponding to JP 04 342966 A (Toshiba Battery Co Ltd) Nov. 30, 1992.

Chemical Abstracts, vol. 79, No. 14, Oct. 8, 1973, Columbus Ohio US: Abstract No. 80201, Guha, A.K., "Liquid binders for jute non–woven fabrics".

* cited by examiner

Primary Examiner—Laura Weiner
(74) Attorney, Agent, or Firm—Sughrue, Mion, Zinn, Macpeak & Seas, PLLC

(57) ABSTRACT

The present invention consists in a binder for an electrode in an electrochemical system with a non-aqueous electrolyte, characterized in that it contains acrylonitrile-butadiene rubber and carboxymethylcellulose with an average molecular weight of over about 200 000.

10 Claims, 2 Drawing Sheets

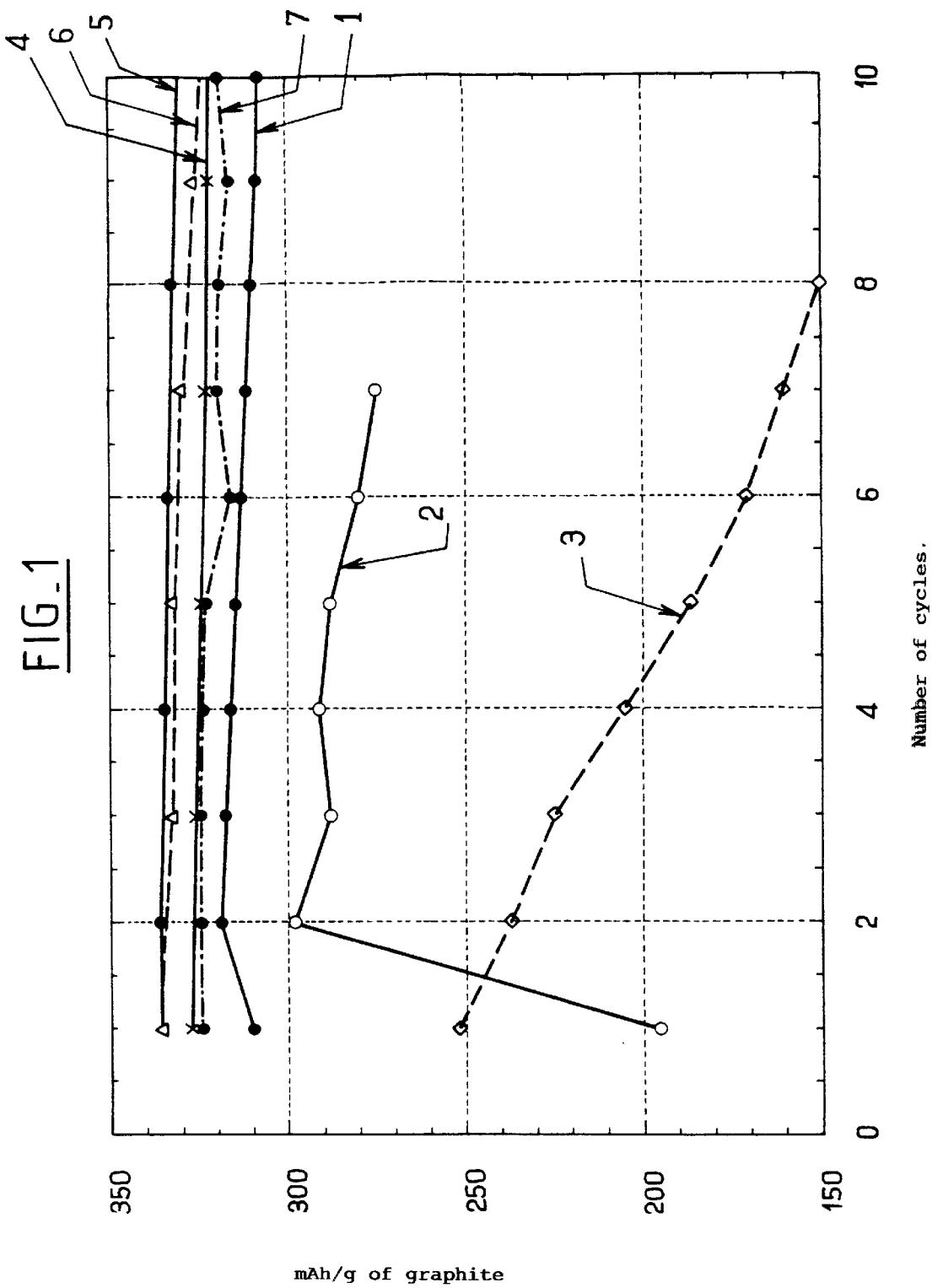

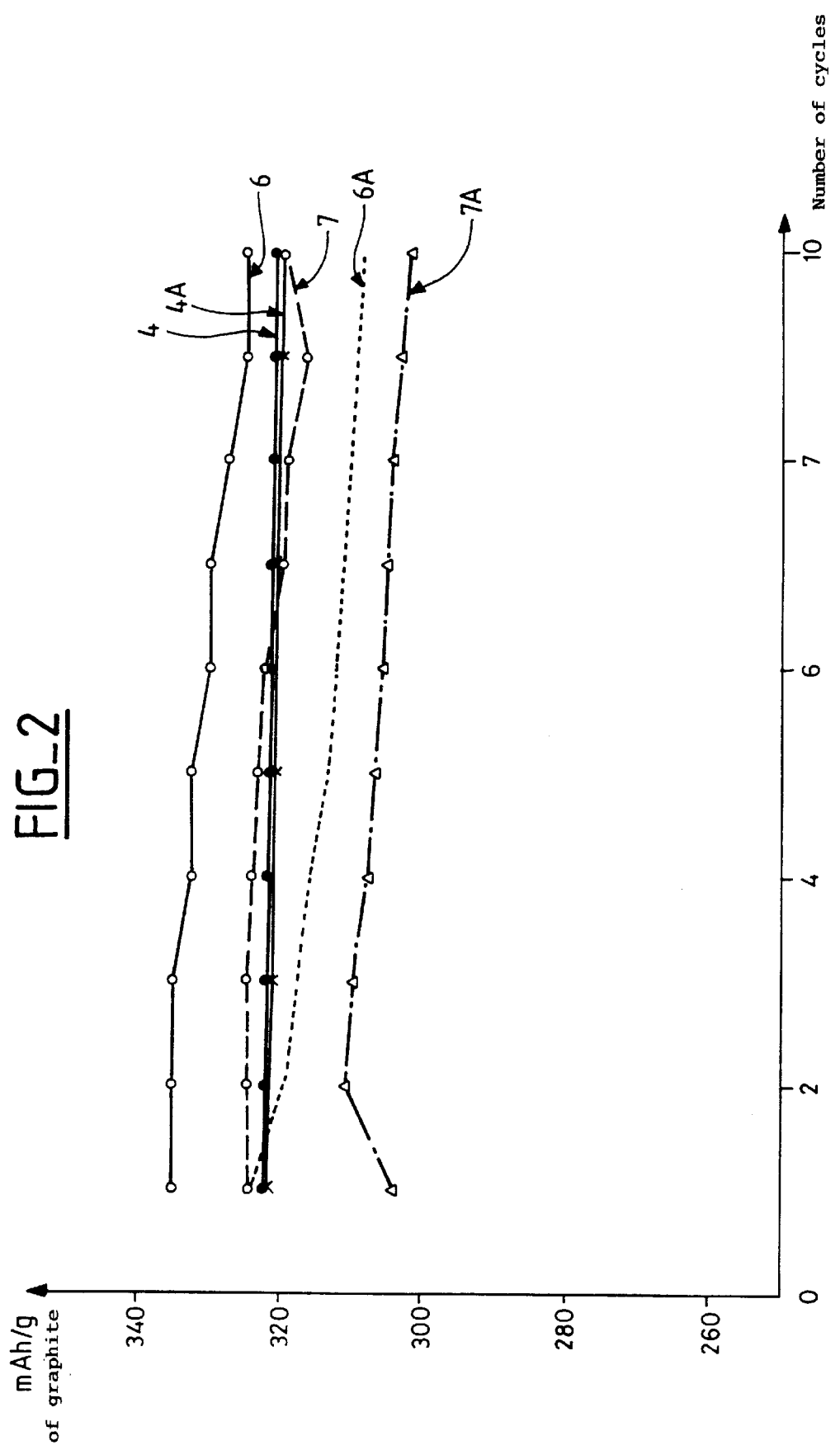
FIG_2

BINDER FOR AN ELECTRODE OF AN ELECTROCHEMICAL SYSTEM WITH A NON-AQUEOUS ELECTROLYTE

The present invention relates to a novel binder for producing an electrode for use in an electrochemical system with a non-aqueous electrolyte, in particular a rechargeable cell with an organic electrolyte.

The present invention also relates to any electrochemical system comprising at least one such electrode.

An electrode in a conventional rechargeable cell with an organic electrolyte contains an electrochemically active material which constitutes a host structure which cations, for example lithium cations, can insert into and leave from during cycling.

Each electrode is obtained by depositing on a current collector a paste containing the electrochemically active material, possibly conductive additives, a polymer binder and a diluent.

The first purpose of using a polymer binder to produce the electrode is to ensure cohesion of the active material, which is in powder form, without masking a large portion of the electrochemically active surface. This effect depends on the wetting properties of the binder. A good bond with the active material is generally guaranteed by the existence in the polymer binder of groups giving rise to chemical bonds or to hydrogen bonds, such as hydroxyl groups, carboxyl groups and amide groups. A compromise must be reached, however, since too strong an interaction of the binder with the active material leads to too much coverage which reduces the active surface and, as a result, the capacity at high rates.

The polymer binder must also allow the paste to adhere to the current collector.

The polymer binder must also endow the electrode with sufficient flexibility to enable it to be manipulated, in particular to withstand winding when producing spiral wound cells.

The polymer binder must accommodate the dimensional variations in the active material during charge-discharge cycles.

These four aims must be satisfied before the cell is assembled and throughout its operation.

The polymer binder must also possess certain electrochemical properties.

In particular, the polymer binder must be compatible with the electrolytes used, preferably without necessitating a cross-linking step which would complicate the electrode formulation and the method used.

Finally, since the reducing agents and oxidizing agents used as the active materials are very powerful, the binder must be as unreactive as possible in order to tolerate extreme operating conditions without degrading.

It thus appears difficult for a single polymer binder to satisfy all of these aims, and some of them appear to be contradictory.

As an example, the electrochemical stability of the electrode on cycling necessitates strong bonds between the polymer binder and the active material. The presence of functional groups accomplishes this function. However, strong inter-chain bonds generally lead to a mechanically rigid structure.

In conventional lithium cells, the binder usually used is a polymer such as polytetrafluoroethylene (PTFE), which has excellent stability in the electrolyte.

However, the antiadhesive properties of PTFE preclude the use of a thin conductive support such as a strip, which is indispensable for producing high energies per unit volume.

Further, the stability of PTFE as regards strong reducing agents is low because of the presence of many fluorine atoms.

Polyvinylidene fluoride (PVDF) and its copolymers, described in document EP-0 492 586, are used as electrode binders in a preparation process employing a metal strip.

This process consists of dissolving the PVDF in a solvent then adding the active material to obtain a paste. The metal strip is thinly coated with the paste comprising the active material and the polymer solution. The solvent is then eliminated by drying the electrode. Dense, thin electrodes are thus obtained.

The mechanical and electrochemical properties of PVDF mean that a good compromise between the multiple criteria described above can be achieved.

However, adhesion to the strip remains poor because of the low surface tension of PVDF, and adhesion promoters have to be added.

Further, the stability of PVDF towards reducing agents is not satisfactory because of the presence of fluorine, leading to safety problems in the event of thermal runaway.

More recently, other polymers have been proposed as a binder for the electrode.

Polyacrylonitrile (PAN) produces excellent electrochemical stability because of its strongly polar groups but the electrode is rigid.

Similarly, polyacrylic acid (PAAc), polyacrylamide (PAA) and their copolymers lead to extremely stable but rigid structures which necessitate the addition of a plasticizer.

Elastomers such as ethylene/propylene/diene terpolymer (EPDM), styrene/butadiene rubber (SER), acrylonitrile/butadiene rubber (NBR) and styrene/butadiene/styrene (SBS) block copolymers or styrene/acrylonitrile/styrene (SIS) block copolymers give the electrode excellent mechanical properties but greatly reduce capacity during cycling.

Document EP-0 606 533 describes polyimides which can produce a good compromise between the mechanical and electrochemical properties but which require a high temperature cross-linking step. Further, polyimides are expensive polymers.

Similarly, mixtures of polymers with complementary properties have been proposed as an electrode binder in which the formulation comprises:

at least one polymer belonging to the non-fluorinated elastomer group which provides the electrode with flexibility, such as ethylene/propylene/diene (EPDM) terpolymer, polyurethane (PU), neoprene, polyisobutylene (PIB) and butyl rubber, and a polymer which is capable of making strong bonds with the active material, containing groups which can form hydrogen bonds such as OH, COOH, $CONH_2$ and NH groups, for example polyvinylalcohol, polyacrylic acid, phenolic resins, polyamides and their copolymers.

The main drawback of such mixtures is the difficulty of producing a homogeneous paste because of the incompatibility of the constituents, along with the difficulty of predicting the distribution of binders in the final electrode, the different components having different solubility or coagulation properties during the solvent elimination step.

The present invention concerns a binder which can satisfy all of the criteria described above.

Document U.S. Pat. No. 5,262,255 describes the use of acrylonitrile-butadiene rubber as a binder for a negative electrode.

Document JP-04 342 966 describes the use of a styrene-butadiene rubber (SBR) and carboxymethylcellulose (CMC)

binder with a degree of polymerization in the range 100 to 2 000 and an average molecular weight in the range 25 000 to 400 000.

The binder represents 0.5% to 5% by weight of the electrode.

As mentioned above, electrodes for conventional rechargeable organic electrolyte cells are obtained by depositing a paste containing the active material, the binder and a diluent on a current collector.

After depositing this paste, the electrode is dried to eliminate the diluent. The electrode obtained is thus constituted by active material and binder. With the aim of optimizing the electrochemical performance of the electrode, in particular its capacity per unit mass, attempts have been made to reduce the proportion of binder.

The present invention is based on the discovery that for a comparable, low amount of binder (3% by weight or less), the electrochemical performance of an electrode containing an acrylonitrile-butadiene/carboxymethylcellulose rubber are better than an electrode containing a styrene-butadiene/carboxymethylcellulose binder, in particular in terms of its capacity per unit mass and aging on cycling.

The present invention is also based on the discovery that when the carboxymethylcellulose used in association with the acrylontrile-butadiene rubber has an average molecular weight (MW) of less than 130 000 the electrochemical performance of the electrode containing the binder is insufficient for the envisaged applications.

The present invention provides a binder for an electrode in an electrochemical system with a non-aqueous electrolyte that contains acrylonitrile-butadiene rubber and carboxymethylcellulose with an average molecular weight of over about 200 000.

The binder of the invention preferably contains an amount of acrylonitrile-butadiene rubber in the range 50% to 70% by weight and an amount of carboxymethylcellulose in the range 30% to 50% by weight with respect to the weight of the two polymers.

More preferably, the binder of the invention contains an amount of acrylonitrile-butadiene rubber in the range 60% to 70% by weight and an amount of carboxymethylcellulose in the range 30% to 40% by weight with respect to the weight of the two polymers.

The present invention is applicable to any electrochemical system, for example a rechargeable cell, a supercapacitor or an electrochromic system, with a non-aqueous electrolyte including at least one electrode containing the binder of the invention.

The electrode can be obtained using the process described below.

The first step of this process consists of producing a paste from a divided active material and the binder of the invention dissolved in water.

The subsequent steps consist of spreading the paste on a metal strip, for example a copper, nickel, steel, stainless steel or aluminum strip, followed by oven drying then rolling until the desired porosity in the range 20% to 60% is obtained.

More particularly, the present invention concerns a rechargeable lithium cell with an organic electrolyte comprising a negative electrode containing the binder of the invention.

Said negative electrode preferably contains an active material selected from any type of material which can intercalate or absorb $Li^+$ cations at low potential, i.e. a potential of less than 1.5 V.

The negative material can be selected from carbons, in particular crystallized carbons, such as graphite powder or graphite fibers, graphitable low crystallinity carbons such as cokes, or non-graphitable carbons such as vitreous carbons or carbon black, and mixtures thereof.

The negative material can also be selected from compounds containing a metal which can form an alloy with lithium, such as metal oxides, sulfides, nitrides and carbides.

Said negative electrode preferably contains less than 6% by weight, preferably about 3% by weight, of binder.

The rechargeable organic electrolyte lithium cell can advantageously also include a positive electrode containing an active material selected from any type of positive material which can intercalate or absorb $Li^+$ cations at high potential, i.e. at a potential of over 2.5 V.

The positive material is preferably based on lithiated transition metal oxides.

The organic electrolyte in the organic electrolyte lithium cell of the invention is preferably a solution of a conductive salt dissolved in a solvent selected from carbonates, including cyclic carbonates such as ethylene, propylene or vinylene carbonates, and non-cyclic carbonates such as dimethyl carbonate, diethyl carbonate, methylethyl carbonate, alkyl esters such as formates, acetates, propionates or butyrates, cyclic compounds including a nitrogen and an oxygen atom, such as N-methylpyrrolidone, ethers and mixtures thereof.

The conductive salt is preferably selected from $LiPF_6$, $LiBF_4$, $LiClO_4$, $LiCF_3SO_3$ and lithium trifluorosulfonimide.

Further characteristics and advantages of the present invention will become clear from the following examples given by way of non limiting illustration with reference to FIGS. 1 and 2.

FIGS. 1 and 2 shows the evolution of the capacity per unit mass in mAh/g of graphite during cycling carried out at 20 mA/g of graphite of different button type cells comprising an electrode produced from the binder of the invention or a prior art binder. The capacity per unit mass is plotted on the vertical axis and the number of cycles is plotted on the horizontal axis.

Curves 1 to 7 in FIG. 1 show the evolution during cycling of the capacity per unit mass of the button cells respectively produced in Examples 1 to 4, 5, 6 and 7.

In FIG. 2, curves 4, 4A, 6, 6A, 7 and 7A show the evolution during cycling of the capacity per unit mass of the button type cells produced respectively in Examples 4, 4A, 6, 6A, 7 and 7A.

EXAMPLES

All of the electrodes described below were tested electrochemically in a button type cell with:

a counter-electrode of lithium metal; and an electrolyte constituted by a mixture of propylene carbonate/ethylene carbonate/dimethyl carbonate in proportions of 1/1/3 in which $LiPF_6$ was dissolved in a concentration of 1 M.

Galvanostatic cycling was carried out at 20 mA/g of graphite. The electrochemical characteristics of the button type cell obtained are shown in Table 1 and in FIGS. 1 and 2.

Example 1, Comparative

Polyvinylidene Fluoride (PVDF)

Amount of Binder in Electrode: 15% by Weight

A 4.8% solution of PVDF in N-methylpyrrolidone (NMP) was prepared by mixing 15 g of PVDF in 200 g of NMP. 85 g of powdered graphite was then gradually added to this solution.

The paste obtained was spread on a copper strip and the electrode was dried at 120° C. then rolled to obtain a porosity in the range 35% to 40%.

The reversible capacity of the negative electrode was relatively stable on cycling, however there was a loss of performance on cycling under extreme conditions at 60° C. resulting in a 0.13% loss of capacity per cycle (see curve 1 of FIG. 1).

Example 2, Comparative
NBR
Amount of Binder in Electrode: 5% by Weight 5 g of acrylonitrile-butadiene rubber (NBR) in solution in N-methylpyrrolidone (NMP) was added to 95 g of powdered artificial graphite.

After evaporating off the solvent (120° C.) the electrode contained 95% graphite and 5% NBR.

The capacity of the negative electrode was low because the polarization of the electrode was too high (see curve 2 in FIG. 1).

Example 3, Comparative
NBR/CMC in Proportions of 2/1 by Weight
Amount of Binder in Electrode: 6% by Weight CMC With MW of Below 130 000

94 g of graphite was added to 4 g of acrylontrile-butadiene rubber (NBR) in solution in 4.1% in water.

2 g of carboxymethylcellulose (CMC) in solution in water at a concentration of 1% by weight was then added to the above mixture. The carboxymethylcellulose used was a low viscosity CMC, i.e. with an average molecular weight in the range 108 300 to 130 000.

The paste obtained was spread onto a copper strip and the electrode was then dried at 120° C. then rolled to produce a porosity in the range 40% to 50%.

The capacity of the negative electrode was unstable on cycling and led to a reduction in performances at 60° C. resulting in a 4.7% loss of capacity per cycle (see curve 3 in FIG. 1).

Example 4
NBR/CMC in Proportions of 2/1 by Weight
Amount of Binder in Electrode: 6% by Weight CMC With a MW of Over About 300 000

94 g of graphite was added to 4 g of acrylontrile-butadiene rubber (NBR) in solution in 4.1% in water.

2 g of carboxymethylcellulose (CMC) in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The capacity of the negative electrode was relatively stable on cycling even under extreme conditions at 60° C. The capacity was 320 mAh/g of graphite after 10 cycles, which corresponded to a 0.06% loss of capacity per cycle (see curve 4 in FIGS. 1 and 2).

Example 4A
SBR/CMC in Proportions of 2/1 by Weight
Amount of Binder in Electrode: 6% by Weight CMC With a MW of Over 300 000

94 g of graphite was added to 4 g of styrene-butadiene rubber (SBR) in solution in 5.1% in water.

2 g of CMC in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The capacity of the negative electrode was relatively stable on cycling even under extreme conditions at 60° C. and comparable to that obtained with the electrode of Example 4.

The capacity was 319 mAh/g of graphite after 10 cycles, which corresponded to a 0.07% loss of capacity per cycle (see curve 4A in FIG. 2).

Example 5
NBR/CMC in Proportions of 2/1 by Weight
Amount of Binder in Electrode: 6% by Weight CMC With a MW of Over About 200 000

94 g of graphite was added to 4 g of acrylontrile-butadiene rubber (NBR) in solution in 4.1% in water.

2 g of CMC in solution in water at a concentration of 1% by weight was then added to the above mixture. The carboxymethylcellulose used was a medium viscosity CMC, i.e. with an average molecular weight in the range 195 000 to 260 000.

The paste obtained was spread onto a copper strip and the electrode was dried at 120° C. then rolled to produce a porosity in the range 40% to 50%.

The capacity of the negative electrode was stable on cycling even under extreme conditions at 60° C. The capacity was 330 mAh/g of graphite after 10 cycles, which corresponded to a 0.16% loss of capacity per cycle (see curve 5 in FIG. 1).

Example 6
NBR/CMC in Proportions of 2/1 by Weight
Amount of Binder in Electrode: 3% by Weight CMC With a MW of Over 300 000

94 g of graphite was added to 2 g of acrylontrile-butadiene rubber (NBR) in solution in 4.1% in water.

1 g of CMC in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The electrode thus contained 97% of graphite, 2% of NBR and 1% of CMC, namely half the amount of binder used in Example 4.

The capacity of the negative electrode was relatively stable on cycling even under extreme conditions at 60° C. The capacity was 324 mAh/g of graphite after 10 cycles, which corresponded to a 0.3% loss of capacity per cycle (see curve 6 in FIGS. 1 and 2).

Example 6A, Comparative
SBR/CMC in Proportions of 2/1 by Weight
Amount of Binder in Electrode: 3% by Weight CMC With a MW of Over 300 000

97 g of graphite was added to 2 g of styrene-butadiene rubber (SBR) in solution in 5.1% in water.

1 g of CMC in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The capacity of the negative electrode was lower than that obtained with the electrode of Example 6. The capacity was 308 mAh/g of graphite after 10 cycles, which corresponded to a 0.5% loss of capacity per cycle (see curve 6A in FIG. 2).

With a binder containing acrylonitrile-butadiene rubber and carboxymethylcellulose with a molecular weight of over about 300 000, the capacity was 324 mAh/g of graphite after 10 cycles, which corresponded to a 0.3% loss of capacity per cycle (see curve 6 in FIG. 2).

For a binder content of 3% in the electrode, the capacity of the electrode containing an acrylonitrile-butadiene/carboxymethylcellulose binder was thus higher than the capacity of the electrode containing a styrene/carboxymethylcellulose binder in the same proportions.

Example 7
NBR/CMC in Proportions of 1/1 by Weight
Amount of Binder in Electrode: 2% by Weight CMC With a MW of Over About 300 000

98 g of graphite was added to 1 g of acrylontrile-butadiene rubber (NBR) in solution in 4.1% in water.

1 g of CMC in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The capacity was 301 mAh/g of graphite after 10 cycles, which corresponded to a 0.35% loss of capacity per cycle (see curve 7A in FIG. 2).

With 3% binder in the electrode the capacity of the electrode containing an acrylonitrile-butadiene/carboxymethylcellulose binder was higher than the capacity of the electrode containing the same proportions by weight of styrene-butadiene/carboxymethylcellulose binder.

TABLE 1

| Composition | | Example | Reversible capacity in first cycle at 20° C. | Capacity during cycling 7 or 10 cycles at 60° C. | Loss of capacity at 60° C. |
| --- | --- | --- | --- | --- | --- |
| Carbon | Binder | N° | (mAh/g of graphite) | (mAh/g of graphite) | (% cycle) |
| Graphite (85%) | PVDF (15%) | 1 comparative | 325 | $C_{10}$ = 310 | 0.13 |
| Graphite (95%) | NBR (5%) | 2 comparative | 150 | $C_7$ = 278 | 0.95 |
| Graphite (94%) | NBR (4%) CMC A (2%) | 3 comparative | 250 | $C_{10}$ = 134 | 4.7 |
| Graphite (94%) | NBR (4%) CMC B (2%) | 4 | 270 | $C_{10}$ = 320 | 0.06 |
| Graphite (94%) | SBR (4%) CMC B (2%) | 4A comparative | 271 | $C_{10}$ = 319 | 0.07 |
| Graphite (94%) | NBR (4%) CMC C (2%) | 5 | 300 | $C_{10}$ = 330 | 0.16 |
| Graphite (97%) | NBR (2%) CMC B (1%) | 6 | 320 | $C_{10}$ = 324 | 0.3 |
| Graphite (97%) | SBR (2%) CMC B (1%) | 6A comparative | 306 | $C_{10}$ = 308 | 0.5 |
| Graphite (98%) | NBR (1%) CMC B (1%) | 7 | 313 | $C_{10}$ = 319 | 0.01 |
| Graphite (98%) | SBR (1%) CMC B (1%) | 7A comparative | 290 | $C_{10}$ = 301 | 0.35 |

CMC type A: CMC with molecular weight in the range 108 300 to 130 000.
CMC type B: CMC with molecular weight in the range 325 000 to 435 000.
CMC type C: CMC with molecular weight in the range 195 000 to 260 000.

1 g of CMC in solution in water at a concentration of 1% by weight was then added to the above mixture. The carboxymethylcellulose used was a high viscosity CMC, i.e. with an average molecular weight in the range 325 000 to 435 000.

The paste obtained was spread onto a copper strip and the electrode was dried at 120° C. then rolled to produce a porosity in the range 40% to 50%.

The electrode thus contained 98% of graphite, 1% of SBR and 1% of CMC, giving a polymer content of 2%.

The capacity of the negative electrode was lower than that obtained with the electrode described in Example 7. The capacity was 319 mAh/g of graphite after 10 cycles, which corresponded to a loss of capacity per cycle of almost zero (see curve 7 in FIG. 1).

Example 7A, Comparative
SBR/CMC in Proportions of 1/1 by Weight
Amount of Binder in Electrode: 2% by Weight CMC With a MW of Over About 300 000

98 g of graphite was added to 1 g of styrene-butadiene rubber (SBR) in solution in 5.1% in water.

What is claimed is:

1. A binder for an electrode in an electrochemical system with a non-aqueous electrolyte, characterized in that the binder contains
   (A) an acrylonitrile-butadiene rubber and
   (B) a carboxymethylcellulose with an average molecular weight of over about 200,000.

2. A binder according to claim 1 containing between 50% and 70% by weight of acrylonitrile-butadiene rubber and between 30% and 50% by weight of carboxymethylcellulose with respect to the weight of the acrylonitrile-butadiene rubber and the carboxymethylcellulose.

3. A binder according to claim 2 containing between 60% and 70% by weight of acrylonitrile-butadiene rubber and between 30% and 40% by weight of carboxymethylcellulose with respect to the weight of the acrylonitrile-butadiene rubber and the carboxymethylcellulose.

4. An electrochemical system which is a rechargeable lithium cell with a non-aqueous organic electrolyte including at least a negative electrode containing a binder according to claim 1.

5. An electrochemical system according to claim 4 wherein said negative electrode contains an active material selected from carbons and metal oxides, sulfides, nitrides or carbides.

6. An electrochemical system according to claim 4 wherein said negative electrode contains less than 6% by weight of binder.

7. An electrochemical system according to claim 6 wherein said negative electrode contains about 3% by weight of binder.

8. An electrochemical system according to any claim 4 wherein said rechargeable lithium cell comprises a positive electrode containing an active material based on lithiated transition metal oxides.

9. An electrochemical system according to claim 4 wherein said organic electrolyte is a solution of a conductive salt dissolved in a solvent selected from carbonates, alkyl esters, cyclic compounds containing a nitrogen and an oxygen atom, ethers or mixtures thereof.

10. An electrochemical system with a non-aqueous electrolyte including at least one electrode containing a binder, wherein the binder contains
   (A) an acrylonitrile-butadiene rubber and
   (B) a carboxymethylcellulose with an average molecular weight of over about 200,000.

* * * * *